United States Patent Office 3,575,889
Patented Apr. 20, 1971

3,575,889
FILM FORMING COATING AGENTS WITH INCREASED ELECTRONIC CONDUCTIVITY
Walter Klopffer, Frankfurt am Main, Helmut Rabenhorst, Frankfurt-Niederrad (Main), and Winfried Willicks, Hofheim, Taunus, Germany, assignors to Henkel & Cie G.m.b.H., Dusseldorf-Holthausen, Germany
No Drawing. Filed Feb. 2, 1967, Ser. No. 613,446
Claims priority, application Germany, Feb. 25, 1966,
H 58,646
Int. Cl. H01b 1/06
U.S. Cl. 252—500
12 Claims

ABSTRACT OF THE DISCLOSURE

Film forming coating agents with increased electronic conductivity containing (1) electron Donators comprising film forming polymers containing aromatic or heterocyclic rings and electron repelling groups, whose ionization energy (I) is less than 8.0 ev. and (2) electron Acceptors comprising monomeric, olefinically unsaturated compounds, quinonoid compounds or benzenoid compounds having electron attracting groups, whose electron affinity ($E_A$) is more than 1.0 ev., in a molar ratio of Acceptor to Donator of 1:500 to 4:10 and $I-E_A$ being between 4.5 to 6.0 ev. The film forming coating agents are useful for antistatic finishing of non-conductive synthetic polymer products.

PRIOR ART

Film forming coating agents for antistatic finishing of non-conductive synthetic polymer products are expected to have, in addition to a sufficient electric conductivity, still other properties to render them suitable for their intended application. It is necessary that the coating have a sufficient adhesiveness and elasticity so that the coating can adapt itself to eventually occurring changes in form and movement of its base. Moreover, the appearance of this base in regard to shape and color should not be changed unfavorably by the coating. Furthermore, it is required that the agents for the antistatic finishing can be prepared in a form, be that a solution, melt or vapor, in which they can be readily applied onto the articles to be finished without any difficulties.

Suitable coating materials are already known on account of British Patent No. 853,186 to render plastics electrically conductive in that, before or during the polymerization of these coating materials, conducting fillers such as metal powder or special kinds of carbon black are added to the starting monomeric compounds. With an addition of about 30% of carbon black, the electric conductivity of the polymerizate is increased in an irregular manner. However, the other characteristics of the product mixture have been altered unfavorably from those of the pure polymerizate to a great extent and this not only with regard to the color. These mixed products are presently suitable as agents for the preparation of conductive coatings only in very rare cases.

Moreover, electrically conductive, high molecular weight, organic compounds have already been prepared by pyrolysis of polymerizates such as polyacrylonitrile (Becher et al., Angenwandte Chemie 1961, page 641). The utilization of these products as coatings is not indicated due to their very dark natural color. Likewise, very heavily colored products are obtained by dissolving neutral tetracyanoquinone-dimethane in a polyvinylpyridinium salt, these products containing the anion of tetracyanoquinone-dimethane (Lupinski, British Plastics, December 1964, page 673).

Furthermore, mixtures of N-vinyl-carbazole polymerizates with one or several electron Acceptors, if so desired, with an addition of optical sensitizers (German application No. DAS. 1,111,935) have already been employed as photoconductive layers for electro-photographic purposes. Likewise, to sensitize photo-conductive layers, as for example, those containing polyvinyl acetate, substances having organic polarizing radicals have been added which can serve as electron Acceptors in the molecular complex (German application No. DAS 1,127,218). However, the plastic layers obtained are conductive only during exposure to light in compliance with their intended application and, consequently, cannot be used in general for an antistatic finishing process.

The two last named combinations form weak Donator-Acceptor complexes which in the literature are generally indicated as Charge-Transfer complexes. As examples of the production of such Charge-Transfer complexes are the combinations of polystyrene, polyvinyl naphthalene or polyacetylene with tetracyanoethylene or chloranil (Slough, Trans. Faraday Soc., 58, 1962, page 2360) and combinations of polydimethylaminostyrene with chloranil (Parrod, Comp. rend., 259, 1964, page 1131, and conference reports of the IUPAC meeting in Prague, 1965, preprint 527). These complexes are distinguished in their absorption spectrum by the occurrence of a Charge-Transfer band. However, as it can be derived from the indicated conference report, no increased electrical conductivity of the complexes compared with the starting materials can be ascertained in the combination of polydimethylaminostyrene with the various Acceptors in an equimolecular ratio. Therefore, the described Donator-Acceptor complexes are not suitable for utilization in the anti-static finishing process as coating agents.

Accordingly, neither by any combination chosen at random of electron Donators with electron Acceptors, nor by the development of Charge-Transfer complexes alone can an essentially increased conductivity of the coating products be attained.

OBJECTS OF THE INVENTION

An object of the present invention is to produce film forming coating agents with increased electronic conductivity with a specific content of electron Donators and electron Acceptors, which possess, in addition to the conductivity necessary for the intended purpose, all of the other characteristics which are necessary for their processing and utilization, so that they are suitable in particular for the antistatic finishing of fibers, threads, textiles, knitted fabrics and foils made of non-conductive plastics.

Another object of the invention is the obtention of film forming coating agents with increased electronic conductivity containing (1) electron Donators comprising film forming polymers containing aromatic or heterocyclic rings and electron repelling groups, whose ionization energy (I) is less than 8.0 ev. and (2) electron Acceptors comprising monomeric, olefinically unsaturated compounds, quinonoid compounds or benzenoid compounds having electron attracting groups, whose electron affinity ($E_A$) is more than 1.0 ev. in a molar ratio of Acceptor to Donator of 1:500 to 4.10 and $I-E_A$ being between 4.5 and 6.0 ev.

These and other objects of the invention will become more apparent as the description thereof proceeds.

DESCRIPTION OF THE INVENTION

According to the invention, these objects have been achieved in that the coating agents contain, as electron Donators, polymers of polymerizable compounds having mono- or polynuclear, aromatic or heterocyclic ring systems, which compounds contain electron repelling groups, the ionization energy (I) of which is less than 8.0 ev. (ev.=electron volts) and which contain as electron Acceptors, monomeric, olefinically unsaturated compounds, quinonoid compounds or benzenoid compounds with electron attracting groups, the electron affinity ($E_A$) of which is more than 1.0 ev., in a molar ratio of Acceptor to Donator $n_A/n_D$ of 1:500 to 4:10, based on the monomeric precursor of said Donator, and $I-E_A$ being in the range of 4.5 to 6 ev. The ionization energy (I) is calculated from the electron transfer energy of the Charge-Transfer complexes (Briegelb et al., Z. Elektrochemie, 63 ,1959, p. 6; Foster, Nature, 183, 1959, p. 1253; Farrell et al., J. Phys. Chem., 69, 1965, p. 3506). A table regarding electron affinities is given in Briegelb, Angewandte Chemie, 76, 1964, p. 326.

By selecting suitable Donators and Acceptors and their comibnation within the given molar ratio, the development of strong Donator-Acceptor complexes with considerable increased conductivity is attained. Matsunaga in the Zeitschrift I. Chem. Phys., 41, 1964, p. 1609, gives a definition of strong Donator-Acceptor complexes. Such strong complexes show in the absorption spectrum, radical cation bands and/or radical anion bands. Their specific conductivity lies between 10 and $10^{-12}$ ohm.$^{-1}$ cm.$^{-1}$. The strength of the complexes is here influenced additionally by the polarization energy of the two components as well as by their steric structure (planar molecules render mesomerism possible and thereby stabilize the radical state) and the molecular size. For example, the alkylamino group exerts a strongly polarizing action and with it an action reducing the ionization energy.

It was found of particular advantage to use as electron Donators, those polymers whose ionization energy (I) amounts to 7.5 to 6.5 ev., and to combine these in the molar ratio of Acceptor to Donator ($n_A/n_D$) of 1:100 to 3:10, based on the monomeric precursor of said Donator, with those electron Acceptors whose electron affinity ($E_A$) amounts ot 1.5 to 2.0 ev. The respective combination of Donator and Acceptor being selected so that $I-E_A$ lies at 4.5 to 5.5 ev.

As suitable starting polymerizable monomers for the polymers used as electron Donators, aromatic or heterocyclic compounds have proved to be advantageous which contain, as electron repelling groups, hydroxyl, amino, alkyl, aralkyl, alkoxy, alkylamino or thioether groups. Particularly suitable are those monomeric starting compounds which contain mono- or polynuclear aromatic ring systems and at least one tertiary nitrogen atom, which, if so desired, can be a component of a heterocyclic ring. The conversion of the monomer into the polymeric form can be effected according to the respective starting compound through a polymerization or a cross-linking reaction.

The monomeric, olefinically unsaturated compounds, quinonoid compounds or benzenoid compounds, serving as electron Acceptors, contain as electron attracting groups, cyano, nitro or halide groups. Here those compounds which contain at least two cyano groups have been found particularly effective.

According to the invention, suitable Donators are, for example, poly p-dimethylaminostyrene, poly 1-vinyl-4-dimethylamino-naphthalene, poly N-vinyl-4-diethylamino-diphenylamine, poly N-vinyl-3-dimethylamino-carbazole, poly N-(p-dimethylaminophenyl)-aziridine, poly N-methyl-3-dimethylamino - 3′ - vinylphenothiazine, poly N-vinyldibenzo-(c,d)-penothiazine, the polymer of methacrylic acid esters of the N,N-trimethyl-N-β-hydroxyethyl-p-phenylenediamines, high molecular cross-linking products of N,N-bis-2,3-epoxypropyl-p-anisidine or of N,N′-diphenyl-N,N′-bis-2,3-epoxy-propyl-p - phenylenediamine or similar polymers, in particular those which contain mono- or poly-nuclear aromatic ring systems and at least one tertiary nitrogen atom, which if so desired may be a component of a heterocyclic ring.

As suitable Acceptors, the following compounds are considered: tetracyanoethylene, tetracyano-p-quinonedimethane, 9-dicyano-methylene-2,4,7-trinitrofluorene, tetracyano-p-benzoquinone, 2,3-dichloro-5,6-dicyano-p-benzoquinone, trichloro-p-benzoquinone, 2,3-dichloro-p-benzoquinone, 2,6-dibromo-p-benzoquinone, mixtures of 2,5- and 2,3-dichloro-p-benzoquinone, o- and p-bromoanil and o- and p-chloranil and p-iodoanil.

The amount of the monomeric electron Acceptor added to the polymeric electron Donator can vary in very wide ranges from about 0.2 to 40 mol percent, preferably 1 to 30 mol percent. The amount depends on the desired conductivity, on the color of the obtained products as well as on its capability to develop usable films.

The film forming surface coating agents of the invention are readily applied to the surface of non-conductive synthetic polymer products in the form of solutions. Where the Acceptor-Donator complex deposits from solution in the form of a film, the synthetic polymer products are merely immersed in the solution and the solvent is allowed to evaporate. Where the Acceptor-Donator complex is formed by a cross-linking reaction, the various ingredients are dissolved in a solvent and the synthetic polymer product is saturated therewith before the cross-linking reaction commences. Since the untreated synthetic polymer products show a surface conductivity of higher than $10^{-13}$ ohm$^{-1}$ cm.$^{-1}$, films having specific conductivities of less than $10^{-12}$ ohm$^{-1}$ cm.$^{-1}$ are useful as antistatic coatings.

The following examples will serve for better comprehension of the invention. They are not, however, to be deemed limitative. All measurements were taken on absolutely anhydrous products with direct current, and the starting substances were always purified to such an extent that their conductivity was less than $10^{-15}$ ohm$^{-1}$ cm.$^{-1}$. In comparison with this very slight conductivity of the starting substances, the products containing Donator-Acceptor complexes exhibit such a high degree of conductivity that they are suitable for the antistatic finishing of non-conductive materials.

Example I p-Dimethylaminobenzaldehyde was reacted with methyl iodide in a Grignard reaction to give p-dimethylamino-benzylcarbinol (yield, 88%), which compound was converted into p-dimethylaminostyrene by heating and by splitting off water with a yield of 65% (see Marvel et al., J. Am. Chem. Soc. 68, 1946, page 736). p-Dimethylaminostyrene was then polymerized in the presence of disodium methylstyrene, employed as catalyst (Parrod et al., Compt. rend. 259, 1964, page 1121) to give a yield of 80% of a polymer with a molecular weight of 8,000 to 10,000. The polymer product obtained was clear as water. Its specific conductivity was below $10^{-15}$ ohm$^{-1}$ cm.$^{-1}$, and its ionization energy (I) amounted to 7.2 ev.

20 grams of this poly p-dimethylaminostyrene were dissolved in methylene chloride and admixed with 1 gm. of tetracyanoethylene (Cairns et al., J. Am. Chem. Soc. 80, 1959, page 2775), the electron affinity ($E_A$) of which amounted to 1.8 ev. The molar ratio of Acceptor to Donator $n_A/n_D$ amounted hereto about 1:17. By allowing the solvent to evaporate in a small tray, a film was produced whose specific conductivity was:

at 20° C., $10^{-12}$ ohm$^{-1}$ cm.$^{-1}$
at 30° C., $7.10^{-11}$ ohm$^{-1}$ cm.$^{-1}$
at 40° C., $2.10^{-11}$ ohm$^{-1}$ cm.$^{-1}$
at 50° C., $7.10^{-10}$ ohm$^{-1}$ cc.$^{-1}$
at 60° C., $10^{-10}$ ohm$^{-1}$ cm.$^{-1}$
at 80° C., $8.10^{-8}$ ohm$^{-1}$ cm.$^{-1}$
at 95° C., $7.10^{-7}$ ohm$^{-1}$ cm.$^{-1}$ The difference, $I-E_A$ was 5.4 ev.

When a textile fabric made of non-conductive, synthetic material was saturated with this solution of the two constituents and allowed to dry so that a film could develop on the surface of this fabric, the tendency of the said fabric to become electrostatically charged was substantially lowered by this procedure due to the increased surface conductivity of the film of the invention.

Example II

By operating according to Example I but utilizing instead of tetracyanoethylene, 1 gm. of tetracyano-p-quinonedimethane (Acker et al., J. Am. Chem. Soc., 84, 1962, page 3370) which possesses an electron affinity of 1.7 ev, the following values were obtained for the specific conductivity of the resultant film. In this case, the molar ratio of Acceptor to Donator $n_A/n_D$ amounted to about 1:27, $I-E_A=5.5$ ev.

at 20° C., $10^{-12}$ ohm.$^{-1}$ cm.$^{-1}$
at 60° C., $8.10^{-11}$ ohm.$^{-1}$ cm.$^{-1}$
at 95° C., $10^{-10}$ ohm.$^{-1}$ cm.$^{-1}$ With a fabric or a foil of non-conductive synthetic material coated with this film, the tendency to become electrostatically charged was also substantially lowered.

Example III

An addition of 2 gm. of tetracyanoquinone-dimethane to 20 gm. of poly p-dimethylaminostyrene resulted in the specific conductivity for the resultant film, as given in the following table. In this case, the molar ratio of Acceptor to Donator $n_A/n_D$ showed a value of about 1:14, for $I-E_A$ again 5.5 ev.

at 20° C., $1.5 \times 10^{-9}$ ohm.$^{-1}$ cm.$^{-1}$
at 60° C., $1.1 \times 10^{-8}$ ohm.$^{-1}$ cm.$^{-1}$
at 95° C., $4.2 \times 10^{-8}$ ohm.$^{-1}$ cm.$^{-1}$ In fabrics, threads or yarns of non-conductive synthetic materials which had been coated with this film by saturation with a solution of the two components in methylenechloride and drying, not only the tendency to become electrostatically charged at any usual application was eliminated, but an antistatic finish sufficient for the final processing resulted.

Example IV 1-vinyl-4-dimethylaminonaphthalene of the formula

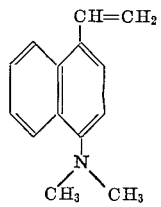

was prepared starting from 4-dimethylaminonaphthaldehyde-1 (Oda et al., Ref. Chem. Abstr. 59, 1963, page 11399) by the subsequent employment of the Grignard method and by splitting off of water while heating.

By polymerization in the presence of disodium methylstyrene as catalyst, 4.0 gm. of polymeric 1-vinyl-4-dimethylaminonaphthalene, whose ionization energy (I) was 7.3 ev., was obtained from 14.5 gm. of monomers.

A solution of the polymer in benzene was admixed with 5% (molar ratio of Acceptor to Donator $n_A/n_D$=about 1:13)

and 10% (molar ratio of Acceptor to Donator $n_A/n_D$=about 1:6)

of tetracyanoethylene, and the conductivity of the film obtained after evaporation of the solvent was determined. The following values were obtained:

The difference of $I-E_A$ was 5.5 ev.

Addition of 5% of tetracyanoethylene $10^{-15}$ ohm.$^{-1}$ cm.$^{-1}$ at 20° C.
$10^{-14}$ ohm.$^{-1}$ cm.$^{-1}$ at 55° C.

Addition of 10% of tetracyanoethylene $10^{-14}$ ohm.$^{-1}$ cm.$^{-1}$ at 20° C.
$10^{-12}$ ohm.$^{-1}$ cm.$^{-1}$ at 55° C.

When a corresponding film with a content of 10% of tetracyanoethylene was produced on a fabric or a foil made of non-conductive synthetic material, the tendency of the fabric or foil to become electrostatically charged was lowered by this procedure due to the increase in the surface conductivity.

Example V

By condensing 4-nitroso-N-diethylaniline with phenylhydrazine to give 4-diethylamino-diphenylamine (Wieland, Ber. 53, 1920, page 1313) and subsequent vinylation according to the Reppe method (Reppe et al., Liebigs Ann., 601, 1956, page 681), N-vinyl-4-diethylaminodiphenylamine of the formula

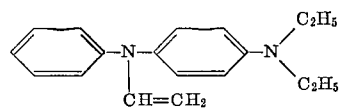

was obtained. The polymerization of 10 gm. of monomeric substance in the presence of disodium methylstyrene as catalyst resulted in 5 gm. of a white polymerizate, the ionization energy (I) of which was 6.7 ev.

To a benzene solution of this polymerizate, respectively, 5% of tetracyanoethylene (molar ratio of Acceptor to Donator $n_A/n_D$=about 1:9 and difference $I-E_A$=4.9 ev.) and 5% of tetracyanoquinone-dimethane (molar ratio of Acceptor to Donator $n_A/n_D$=about 1:15, and difference $I-E_A$=5 ev.) were added. The following values were ascertained for the conductivity of the films obtained by evaporation of the solvent:

Addition of 5% of tetracyanethylene $10^{-13}$ ohm.$^{-1}$ cm.$^{-1}$ at 20° C.
$10^{-11}$ ohm.$^{-1}$ cm.$^{-1}$ at 55° C.

Addition of 5% of tetracyanoquinone-dimethane $10^{-12}$ ohm.$^{-1}$ cm.$^{-1}$ at 20° C.
$10^{-10}$ ohm.$^{-1}$ cm.$^{-1}$ at 55° C.

When fabrics or foils of non-conductive synthetics were coated with these films, their tendency to become electrostatically charged was substantially lowered.

Example VI

According to already known methods used by Lindemann (Lindemann, Ber. 57, 1924, page 555), carbazole was nitrated to give 3-nitro-carbazole and, subsequently, reduced to give 3-aminocarbazole (Ziersch, Ber. 42, 1909, page 3797). By means of methylation and vinylation according to known methods, N-vinyl-3-dimethylaminocarbazole of the formula

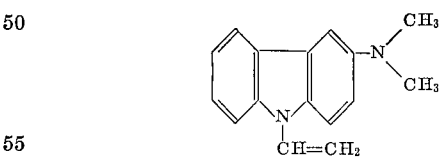

was obtained. By polymerization of 12 gm. of this monomer in the presence of disodium methylstyrene as catalyst, 8 gm. of a white polymerization product, whose ionization energy (I) was 6.9 ev., were obtained.

A benzene solution of the polymer was admixed with various monomer Acceptors. After evaporation of the solvent, the conductivity of each of the films obtained was determined as follows:

On addition of 5% of chloranil, whose electron affinity was 1.35 ev. (molar ratio of Acceptor to Donator $n_A/n_D$=about 1:21, difference $I-E_A$=5.55 ev.)

$10^{-12}$ ohm.$^{-1}$ cm.$^{-1}$ at 20° C.
$10^{-10}$ ohm.$^{-1}$ cm.$^{-1}$ at 55° C.

On an addition of 5% of tetracyanoethylene (molar ratio of Acceptor to Donator $n_A/n_D$=about 1:11, difference $I-E_A$=5.1 ev.)

$10^{-10}$ ohm.$^{-1}$ cm.$^{-1}$ at 20° C.
$10^{-8}$ ohm.$^{-1}$ cm.$^{-1}$ at 55° C.

On an addition of 5% of tetracyanoquinone-dimethane (molar ratio of Acceptor to Donator $n_A/n_D=$ about 1:17, difference $I-E_A=5.2$ ev.)

$10^{-9}$ ohm$^{-1}$ cm.$^{-1}$ at 20° C.
$10^{-6}$ ohm$^{-1}$ cm.$^{-1}$ at 55° C.

On an addition of 5% of 9-dicyanomethylene-2,4,7-trinitrofluorene (Mukherjee, I. Org. Chem., 30, 1965, page 644) of the formula

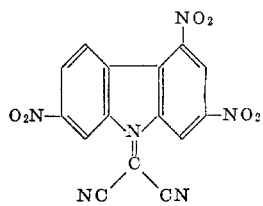

whose electron affinity was 1.4 ev. (molar ratio of Acceptor to Donator $n_A/n_D=$about 1:30, difference $I-E_A=5.5$ ev.)

$10^{-10}$ ohm$^{-1}$ cm.$^{-1}$ at 20° C.
$10^{-7}$ ohm$^{-1}$ cm.$^{-1}$ at 55° C.

When the respective films were produced on a fabric or a foil of non-conductive synthetic materials with the aid of the indicated benzene solutions and drying, this measure resulted in lowering their tendency to become electrostatically charged to a very substantial degree. Films produced from the three last-named compositions were, moreover, suited for the antistatic finishing of threads or yarns for the final processing.

Example VII

According to the Bernth's Reaction, sulfur was introduced into 2,2'-dinaphthylamine (Kehrmann et al., Ber. 55, 1922, page 2346), and thereafter the resultant reaction product was vinylized in the usual manner to give N-vinyldibenzo-(c,d)-phenothiazine of the formula

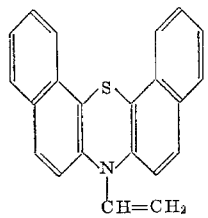

By polymerization of this monomer in the presence of disodium methylstyrene as catalyst, a yellow polymer product was obtained having an ionization energy (I) of 6.7 ev.

A solution of this polymer product in tetrahydrofurane was admixed with 5% of each of the following Acceptors, and after the evaporation of the solvent, the conductivities of the films formed were ascertained.

On an addition of 5% of 2,3-dichloro-5,6-dicyano-p-benzoquinone of the formula

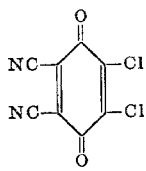

whose electron affinity was 1.9 ev. (molar ratio of Acceptor to Donator $n_A/n_D=$about 1:14, difference $I-E_A=4.8$ ev.)

$10^{-8}$ ohm$^{-1}$ cm.$^{1-}$ at 20° C.
$10^{-5}$ ohm$^{-1}$ cm.$^{-1}$ at 55° C.

On an addition of 5% of tetracyanoquinone-dimethane (molar ratio of Acceptor to Donator $n_A/n_D=$about 1:12, difference $I-E_A=5$ ev.)

$10^{-9}$ ohm$^{-1}$ cm.$^{-1}$ at 20° C.
$10^{-6}$ ohm$^{-1}$ cm.$^{-1}$ at 55° C.

Due to their satisfactory conductivity, the films obtained were suitable for the prevention of electrostatic charging of fabrics and foils as well as the antistatic finishing of fibers, threads and yarns in preparation for their final processing.

Example VIII

By reaction in the usual manner of trimethyl-p-phenylenediamine with chlorohydrin, followed by the esterification of the resultant alcohol with methacrylic acid, the methacrylic acid ester of N,N-trimethyl-N-β-hydroxyethyl-p-phenylenediamine of the formula

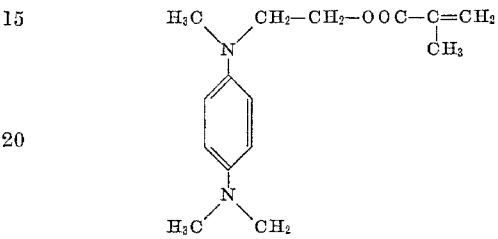

was obtained. The polymerization of this monomer in the presence of disodium methylstyrene as catalyst resulted in a polymerization product having an ionization energy (I) of 6.6 ev.

When a solution of the polymer product in tetrahydrofurane was admixed with 5% of tetracyanoquinonedimethane, a film with the conductivity of $10^{-10}$ ohm$^{-1}$ cm.$^{-1}$ at 20° C. and $10^{-6}$ ohm$^{-1}$ cm.$^{-1}$ at 55° C. was obtained from these components. The molar ratio of Acceptor to Donator $n_A/n_D$ was about 1:15, the difference $I-E_A$ showed a value of 4.9 ev.

Due to its excellent conductivity, this type of film is suitable for the antistatic finishing textiles, knitted fabrics and foils as well as for the pre-treatment of fibers, threads and yarns made of non-conductive synthetic materials before mechanical working-up, which frequently may lead to strong electrostatic charging.

Example IX

By reacting anisidine with epichlorohydrin and by splitting off of hydrogen chloride, according to well known methods for the preparation of epoxides, N,N-bis-2,3-epoxypropyl-p-anisidine of the formula

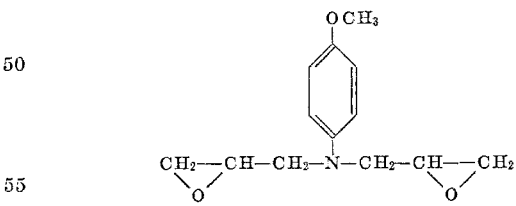

was obtained. When a solution of 23.5 gm. (0.1 mol) of the monomer product in tetrahydrofurane was admixed with 4.12 gm. (0.04 mol) of diethylenetriamine as hardening agent, an insoluble, heavily cross-linked film was obtained, the ionization energy (I) of which was 7.0 ev.

To obtain, in the present case, a film with increased conductivity it was necessary, because of the insolubility of the polymeric Donator, to add the Acceptor first to the monomeric base element of the Donator and only then to execute the cross-linking by adding the hardening agent. If a solution of 23.5 gm. (0.1 mol) of N,N-bis-2,3-epoxypropyl-p-anisidine in tetrahydrofuran was admixed with 1.18 gm. of 9-dicyanomethylene-2,4,7-trinitrofluorene (5%) as Acceptor, as well as with 4.12 gm. (0.04 mol) of diethylenetriamine as hardening agent, a film was obtained with a conductivity of $10^{-12}$ ohm$^{-1}$ cm.$^{-1}$ at 20° C. and of $10^{-10}$ ohm$^{-1}$ cm.$^{-1}$ at 55° C. The molar ratio of Acceptor to Donator $n_A/n_D$ was about 1:30, and the difference $I-E_A$ had a value of 5.6 ev.

By immersing a textile, a knitted fabric or a foil made of non-conductive material, in the tetrahydrofurane solution of the monomer product admixed with the Acceptor and the hardening agent, a cross-linked film can be produced on the synthetic articles after the hardening process has been completed. This film showed a substantial lowering of the tendency of the articles to become electrostatically charged due to the increased surface conductivity.

Example X

By means of a known reaction process, the N,N'-diphenyl-N,N'-bis-2,3-epoxypropyl - p - phenylenediamine of the formula

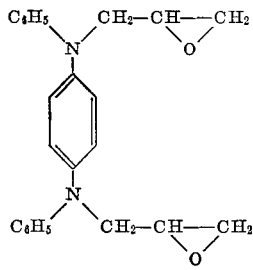

was obtained from N,N₂-diphenyl-p-phenylene-diamine. When a solution of 37.2 gm. (0.1 mol) of the monomer product in tetrahydrofurane was admixed with 4.12 gm. (0.04 mol) of diethylenetriamine as hardener, an insoluble, heavily cross-linked film was obtained having an ionization energy (I) of 6.6 ev.

To arrive at a film with increased conductivity, a solution of 37.2 gm. (0.1 mol) of the monomeric epoxide in tetrahydrofurane was admixed with 1.86 gm. of 9-dicyanomethylene-2,4,7-trinitrofluorene (5%) as Acceptor as well as admixed with 4.12 gm. (0.04 mol) of diethylenetriamine as hardener. The conductivity of the resultant film was $10^{-11}$ ohm$^{-1}$ cm.$^{-1}$ at 20° C. and $10^{-8}$ ohm$^{-1}$ cm.$^{-1}$ at 55° C. The molar ratio of Acceptor to Donator $n_A/n_D$ was about 1:18 and the difference $I-E_A$ had a value of 5.2 ev.

When textiles, knited fabrics or foils of non-conductive synthetics were coated with this film, their tendency to become electrostatically charged was substantially lowered.

Example XI 1.47 gm. of poly p-dimethylaminostyrene, prepared as described in Example I, having a conductivity below $10^{-15}$ ohm$^{-1}$ cm.$^{-1}$ and an ionization energy of 7.2 ev., were dissolved in benzene. A benzene solution of 2.27 gm. of dichlorodicyano-p-benzoquinone, having an electron affinity of 1.9 ev., was added to this solution, whereby a green precipitate was formed, which was filtered off and washed. The theoretically resultant values of the formed Donator-Acceptor complex showed a molar ratio of 1:1 for the Acceptor to Donator $n_A/n_D$ ratio and a difference $I-E_A$ of 5.3 ev. The chloride analysis of the precipitate showed an actual molar ratio for Acceptor to Donator $n_A/n_D$ of 8.2:10, whereas Parrod, in the conference report of the IUPAC meeting in Prague 1965, preprint 527, gives a ratio of 9.3:10. A pellet was compressed from this precipitate and its specific conductivity was determined, resulting in the following values:

at 22° C., $2.3 \times 10^{-14}$
at 43° C., $3.6 \times 10^{-14}$
at 64° C., $3.9 \times 10^{-14}$
at 95° C., $10^{-13}$ Accordingly, the conductivity of the product obtained was entirely insufficient for a practical utilization and, moreover, no film could be produced from this substance with the high Acceptor content by means of the usual methods.

Thereafter, benzene solutions of 1.47 gm. of poly p-dimethylaminostyrene and 0.023 gm. of dichlorodicyano-p - benzoquinone were combined, the molar ratio of Acceptor to Donator $n_A/n_D$ amounting to 1:100. The film obtained from this solution by evaporation of the solvent showed the following conductivity:

at 20° C., $10^{-15}$
at 80° C., $3 \times 10^{-14}$
at 95° C., $10^{-13}$

The above values indicated that for this particular Donator-Acceptor combination with a molar ratio of 1:100, no appreciable increase in conductivity had yet occurred. The beginning of a useful conductivity increase starts with these different Donators and Acceptors naturally with varying Acceptor contents, and with other combinations at a molar ratio of Acceptor to Donator $n_A/n_D$ of 1:100, this increase is already fairly noticeable.

Next, benzene solutions of 1.47 gm. of poly p-dimethylaminostyrene and 0.230 gm. of dichlorodicyano-p-benzoquinone were combined which corresponded with a molar ratio for Acceptor to Donator $n_A/n_D$ of about 1:10. The resultant film showed the following conductivity values:

at 20° C., $6 \times 10^{-14}$
at 40° C., $3 \times 10^{-13}$
at 60° C., $1.4 \times 10^{-12}$
at 80° C., $6 \times 10^{-12}$
at 95° C., $1.6 \times 10^{-11}$ With this Acceptor content a considerable conductivity increase was obtained.

When a molar ratio of Acceptor to Donator $n_A/n_D$ of about 2:10 was chosen, that means when benzene solutions of 1.47 gm. of poly p-dimethylaminostyrene and 0.460 gm. of dichlorodicyano-p-benzoquinone were combined, the film obtained showed the following conductivity values:

at 20° C., $1.2 \times 10^{-13}$
at 40° C., $7 \times 10^{-13}$
at 60° C., $4 \times 10^{-12}$
at 80° C., $2 \times 10^{-11}$
at 95° C., $6 \times 10^{-11}$ The conductivity values of a film obtained by combining benzene solutions of 1.47 gm. of poly p-dimethylaminostyrene and 0.690 gm. of dichlorodicyano-p-benzoquinone ($n_A/n_D$=about 3:10) and subsequent evaporation of the solvent amounted to:

at 20° C., $7 \times 10^{-13}$
at 40° C., $5 \times 10^{-12}$
at 60° C., $3 \times 10^{-11}$
at 80° C., $1.5 \times 10^{-10}$
at 95° C., $5 \times 10^{-10}$ When the Acceptor content was further increased, the conductivity of the product could be slightly increased up to a molar ratio $n_A/n_D$ of about 4:10. However, the film formation left much to be desired. In the case that the Acceptor content was still more increased so that the molar ratio $n_A/n_D$ increased above 4:10, that is to 1:2 and still higher, the relative conductivity values showed a steep drop. According to the usual methods, no films could be produced anymore from products having these high Acceptor contents, $n_A/n_D$ greater than 4:10.

Materials based on synthetic polymers, such as polyamides, polyesters, polyacrylates, polymethacrylates, polyolefins and the like, are known to exhibit a tendency to accumulate electrostatic charges when processed or used under ordinary conditions.

The advantages of the film forming coating agents obtained according to the process of the invention consist primarily in that with their aid the antistatic finishing of fibers, threads, textiles, knitted fabrics and foils of these non-conductive synthetic materials can be easily achieved. The film coatings of the invention distinguish themselves, in addition to their good and widely variable electric conductivity, by their light coloring, so that they do not change the treated substrates in any unfavorable manner. In contrast to the electrically conductive organic compounds previously known, which are either completely insoluble and infusible or can be dissolved only in otherwise entirely useless high boiling solvents, such as dimethylformamide, the polymers prepared according to the invention are either soluble even in the usual low boiling solvents, such as methylene chloride, chloroform and other chlorinated hydrocarbons as well as in tetrahydrofurane without any difficulty, or they can be applied onto the articles to be coated in the form of the solution of their monomer parent substances in combination with the electron Acceptors and corresponding cross-linking agents. The cross-linking film formation occurs only during the application itself. Since, furthermore, the products used according to the invention behave like the usual thermoplastics, a finishing process, used for these synthetics, can be accomplished even when the polymer film has insufficient solubility or complete insolubility. For example, coatings can be obtained from melts by fluidized bed sintering, by spraying while heating or under flame or by other finishing techniques. Due to the various possibilities of processing, the products to be used according to the invention are of particular technical value, as they open ways and means for the antistatic finishing of sensitive substrates, which are affected too greatly, for example, by strong solvents or by excessive heating.

The preceding specific embodiments are illustrative of the invention. It is to be understood, however, that other expedients known to those skilled in the art may be employed without departing from the spirit of the invention.

We claim:

1. Film forming coating agents with increased electron conductivity consisting essentially of a mixture of (1) electron Donators and (2) electron Acceptors, in a molar ratio of Acceptor to Donator of from 1:100 to 4:10, based on the monomeric precursor of said Donator, said electron Donators consisting essentially of film forming polymers whose ionization energy (I) is less than 8.0 eV, said film forming polymer being selected from the group consisting of poly-p-dimethylaminostyrene, poly - 1 - vinyl-4-dimethylamino-naphthalene, poly - N - vinyl - 4 - diethylaminodiphenylamine, poly - N - vinyl - 3-dimethyl-aminocarbazole, poly - N - (p - dimethylaminophenyl)-aziridine, poly - N - methyl - 3 - dimethylamino-3'-vinyl-phenothiazine, poly - N - vinyl - dibenzo-(c,d)-phenothiazine, the polymer of methacrylic acid esters of the N,N-trimethyl-N-$\beta$-hydroxyethyl - p - phenylenediamines, and polymeric forming compositions of N,N-bis-2,3-epoxypropyl - p - anisidine and N,N'-diphenyl-N,N'-bis-2,3-epoxypropyl-p-phenylenediamine with diethylene triamine, and said electron Acceptors being selected from the group consisting of tetracyanoethylene, tetracyano-p-quinone-dimethane, 9-dicyanomethylene-2,4,7-trinitrofluorene, tetracyano - p - benzoquinone, 2,3 - dichloro-5,6-dicyano-p-benzoquinone, trichloro - p - benzoquinone, 2,3-dichloro-p-benzoquinone, 2,6-dibromo - p - benzoquinone, mixtures of 2,5-dichloro- and 2,3-dichloro-p-benzoquinone, o- and p-bromanil, o- and p-chloranil, p-iodoanil and mixtures thereof, whose electron affinity ($E_A$) is more than 1.0 ev., the value I–$E_A$ being between 4.5 and 6.0 ev.

2. The film forming coating agents of claim 1 wherein said electron Donators have an ionization energy (I) of between 7.5 to 6.5 ev., said electron Acceptors have an electron affinity ($E_A$) of between 1.5 to 2.0 ev., said molar ratio of Acceptor to monomer units of Donator being between 1:100 and 3:10, and the value I–$E_A$ being between 4.5 and 5.5 ev.

3. The film coating agents of claim 1 wherein said electron Donator is poly-p-dimethylaminostyrene.

4. The film coating agents of claim 1 wherein said electron Donator is polymeric 1-vinyl-4-dimethylamino-naphthalene.

5. The film coating agents of claim 1 wherein said electron Donator is polymeric N-vinyl-4-diethylamino-diphenylamine.

6. The film coating agents of claim 1 wherein said electron Donator is polymeric N-vinyl-3-dimethylamino-carbazole.

7. The film coating agents of claim 1 wherein said electron Donator is polymeric N-vinyl-dibenzo-(c,d)-phenothiazine.

8. The film coating agents of claim 1 wherein said electron Donator is polymeric methacrylic acid ester of N,N'-trimethyl-N-$\beta$-hydroxyethyl - p - phenylenediamine.

9. The film coating agents of claim 1 wherein said electron Donator is a crosslinked polymer of N,N-bis-2,3-epoxypropyl-p-anisidine with diethylenetriamine.

10. The film coating agents of claim 1 wherein said electron Donator is a crosslinked polymer of N,N'-diphenyl - N,N' - bis - 2,3 - epoxypropyl - p-phenylenediamine with diethylenetriamine.

11. The film coating agents of claim 1 wherein said electron Acceptor is selected from the group consisting of tetracyanoethylene, tetracyano - p - quinone-dimethane, 9 - dicyanomethylene - 2,4,7 - trinitrofluorene, tetracyano-p-benzoquinone, and 2,3-dichloro-5,6-dicyano-p-benzoquinone.

12. A method of producing an antistatic finish on an organic synthetic polymer product which comprises applying a film forming coating agent of claim 1 to the surface of said non-conductive synthetic polymer product.

References Cited

UNITED STATES PATENTS

| 3,334,109 | 8/1967  | Harris         | 260—294.9 |
| 3,419,537 | 12/1968 | Rembaum et al. | 260—85.5  |

OTHER REFERENCES

Rembaum et al.: "Polymeric Semiconductors" article from Birks et al. Progress in Dielectrics (1965), pp. 58, 59, 60, Temple Press, London.

JOHN DAVID WELSH, Primary Examiner

U.S. Cl. X.R.

117—201. 139.5; 252—8.6, 8.8